Figure 1:
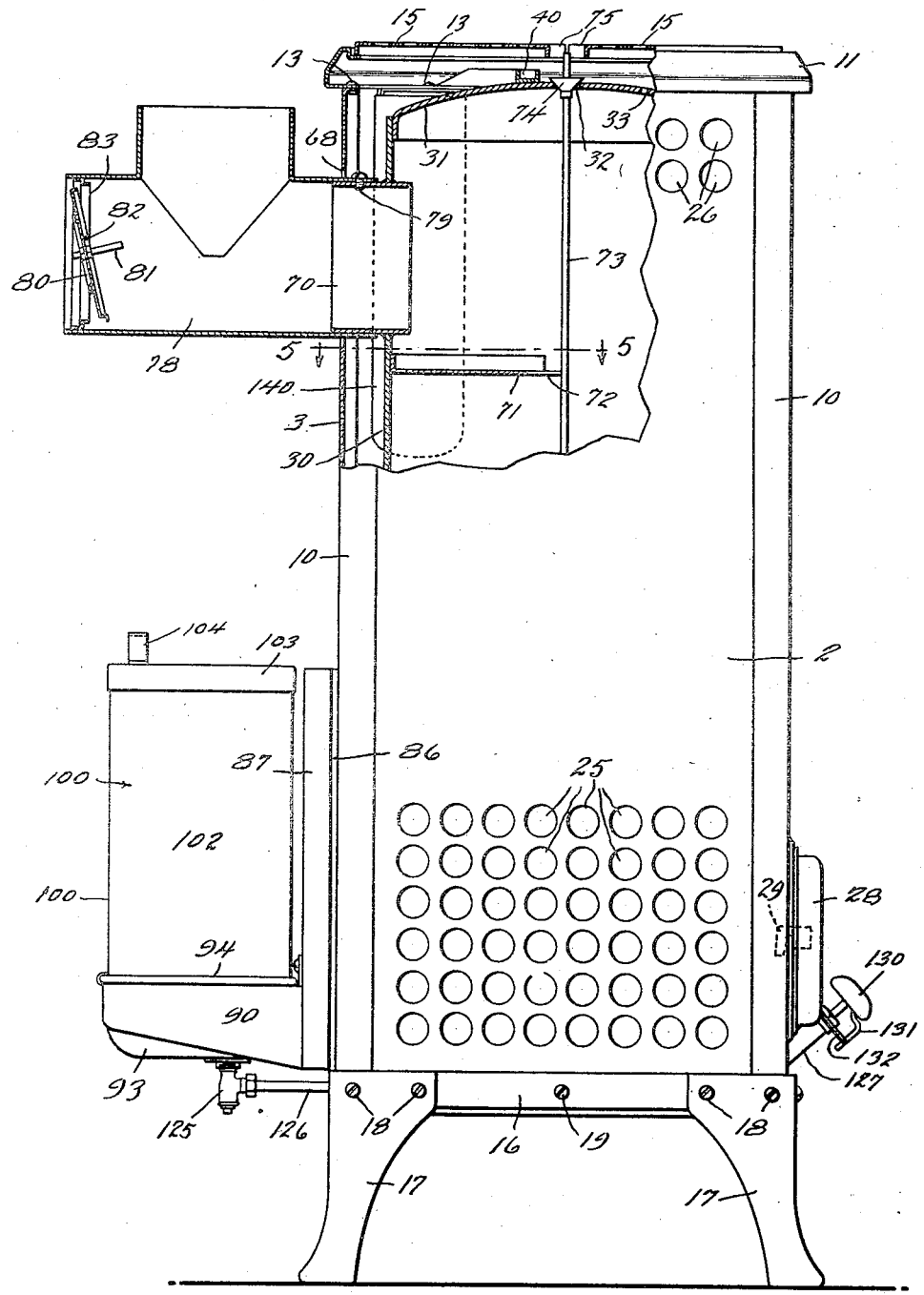

Jan. 23, 1934.　　　L. S. CHADWICK ET AL　　　1,944,593
HEATING APPARATUS
Filed Oct. 13, 1930　　　11 Sheets-Sheet 1

INVENTORS
Lee S. Chadwick,
BY Marc Resek and
Charles J. Kessler
Hull, Brock & West
ATTORNEYS Jan. 23, 1934.   L. S. CHADWICK ET AL   1,944,593
HEATING APPARATUS
Filed Oct. 13, 1930   11 Sheets-Sheet 3

INVENTORS
Lee S. Chadwick
BY Marc Resek and
Charles J. Kessler
Hull, Brock & West  ATTORNEYS Jan. 23, 1934.  L. S. CHADWICK ET AL  1,944,593
HEATING APPARATUS
Filed Oct. 13, 1930  11 Sheets-Sheet 4

INVENTORS
Lee S. Chadwick,
BY Marie Resek and
Charles J. Kessler
Hull, Brock & West ATTORNEYS Jan. 23, 1934.　　L. S. CHADWICK ET AL　　1,944,593
HEATING APPARATUS
Filed Oct. 13, 1930　　11 Sheets-Sheet 5
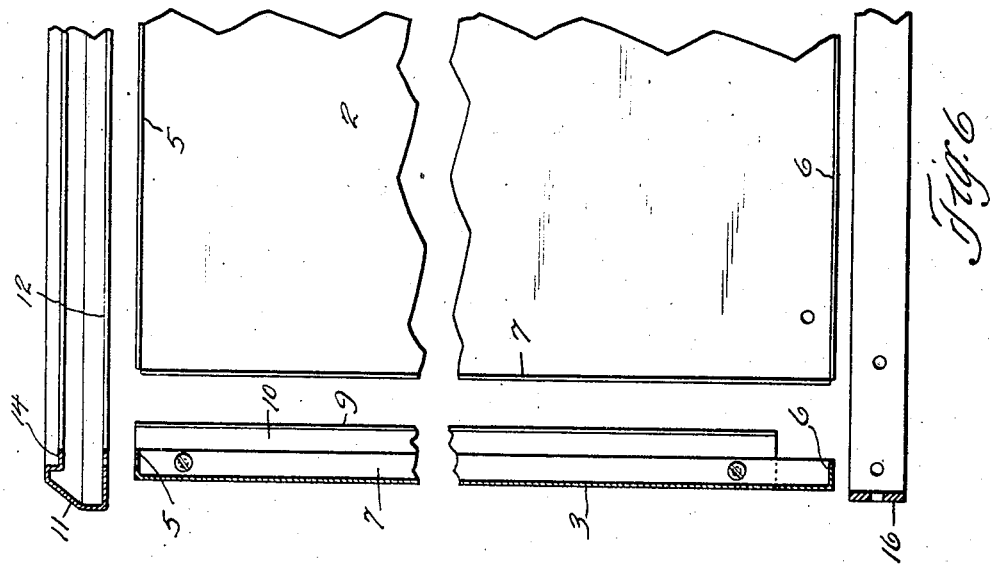
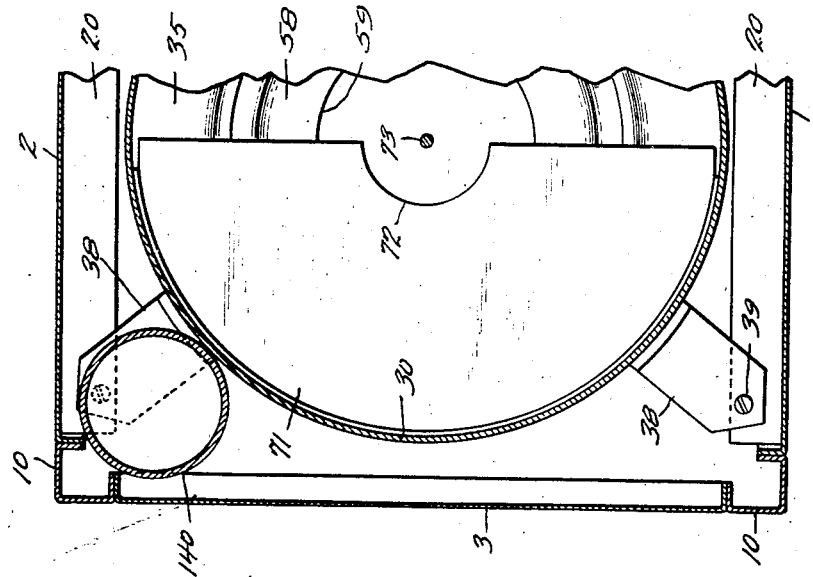

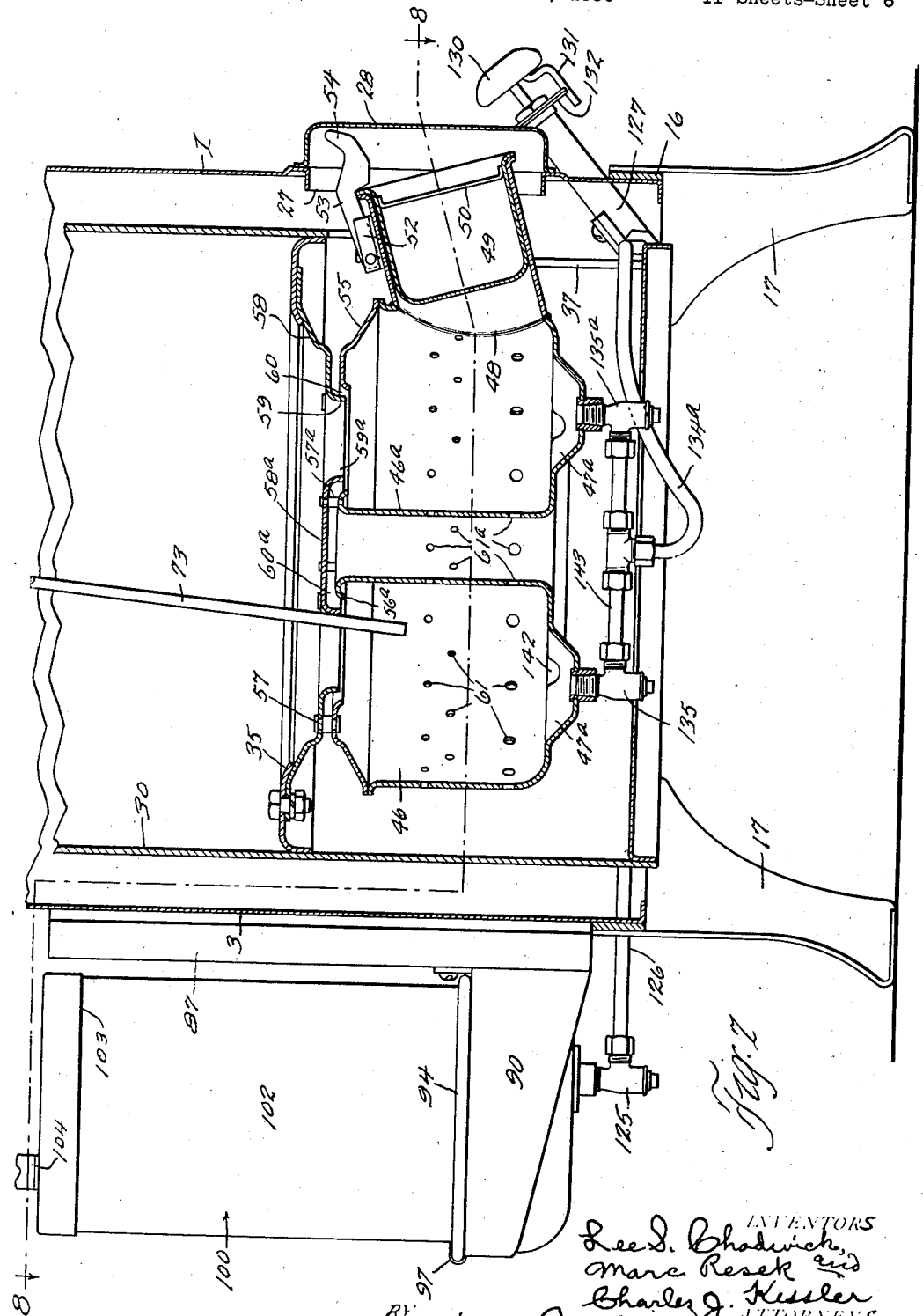

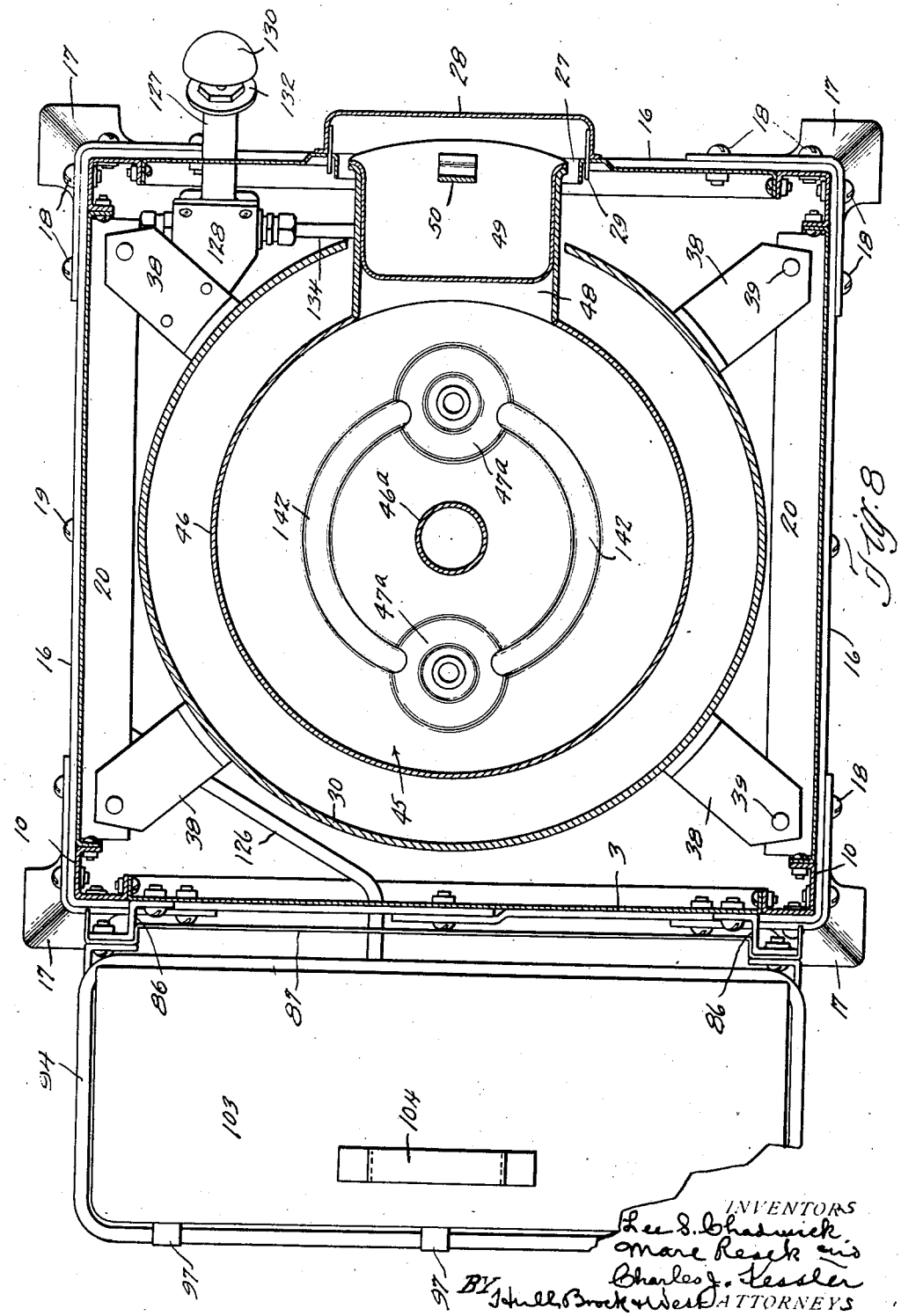

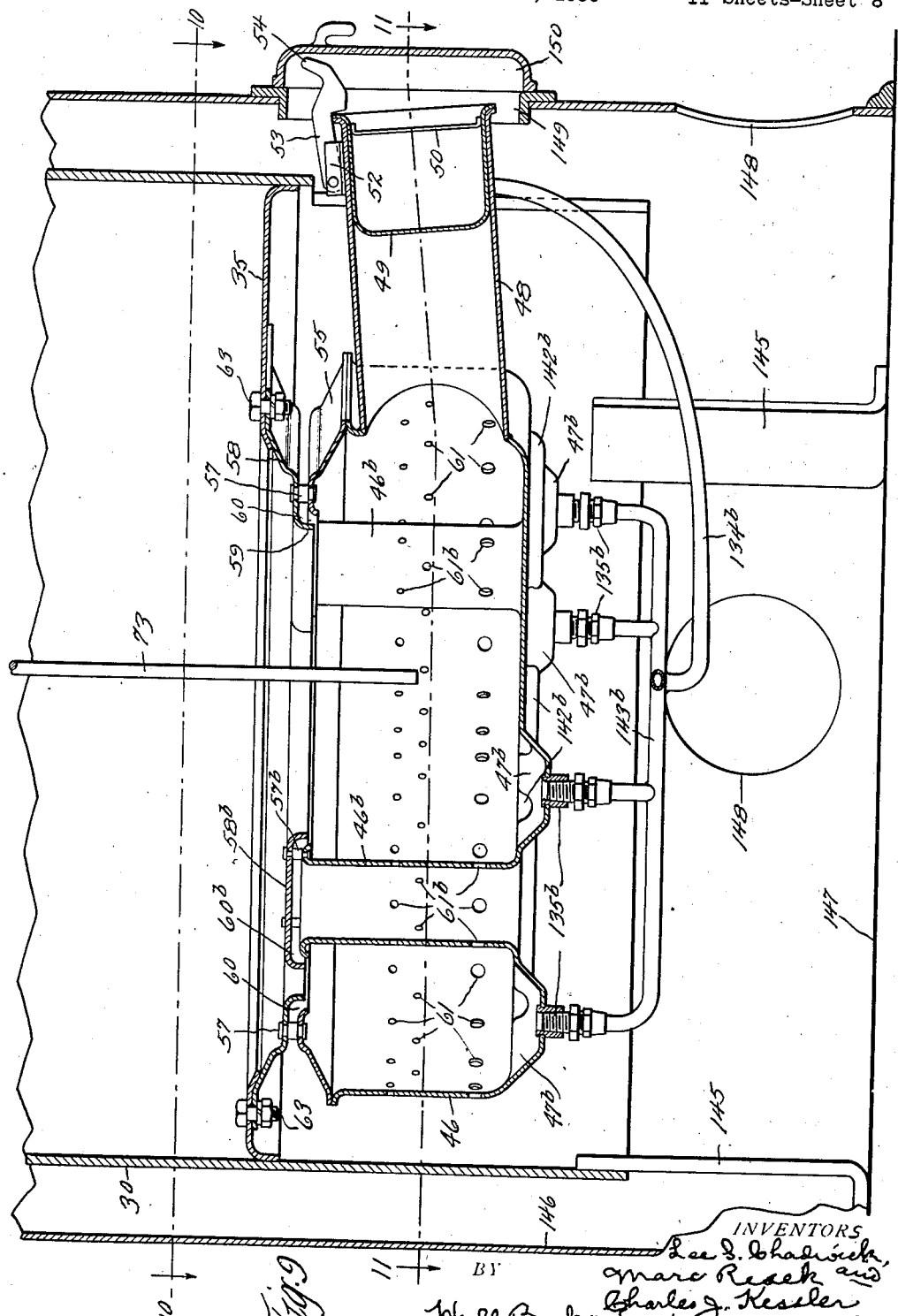

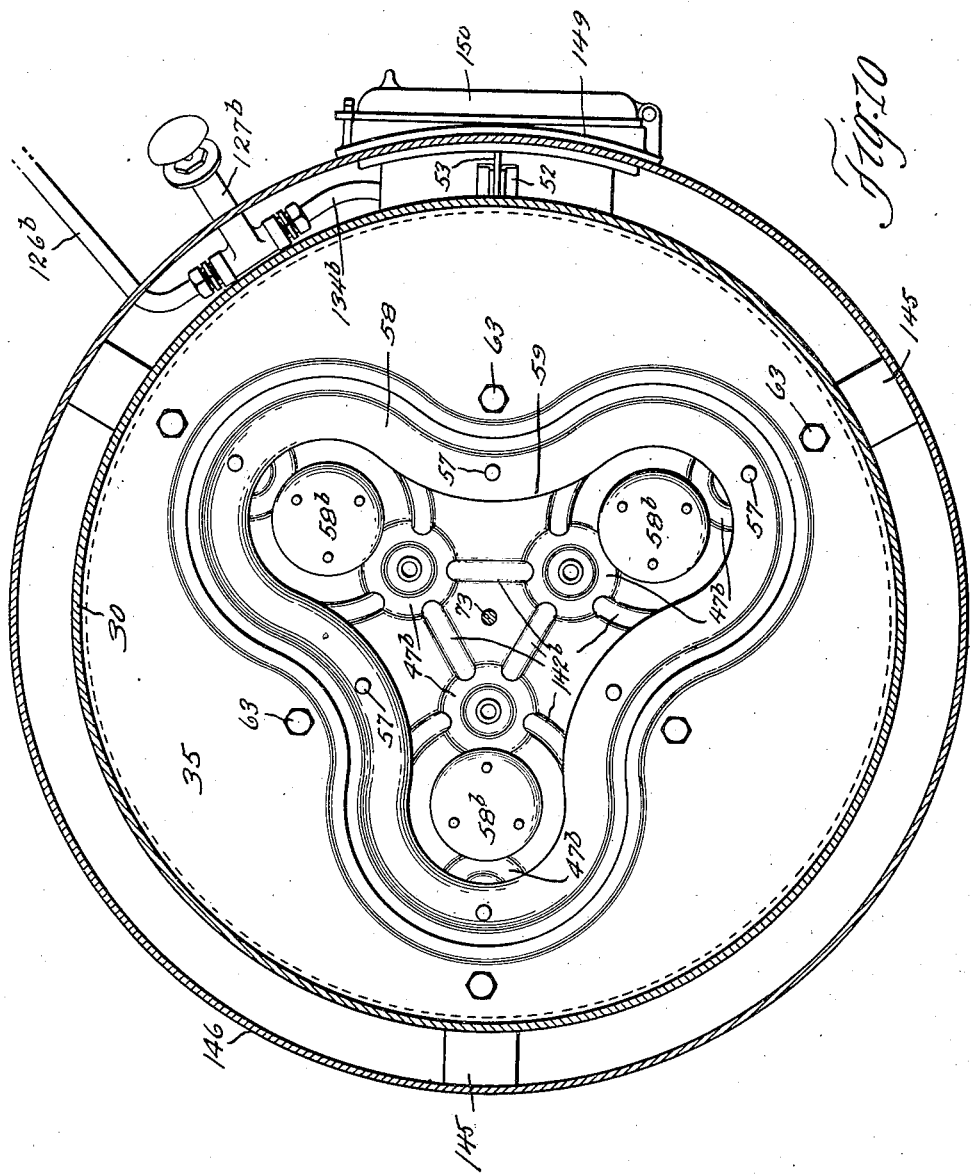

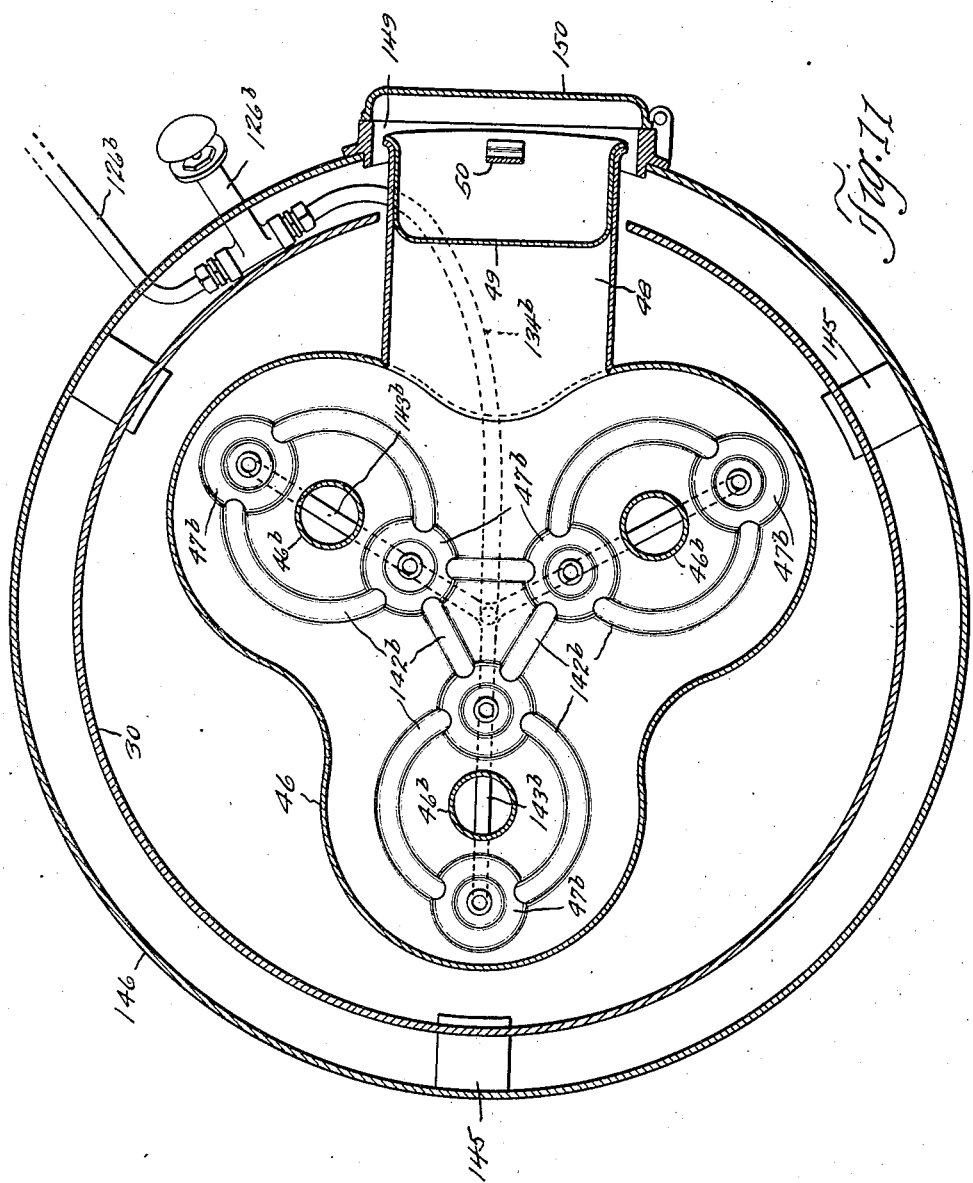

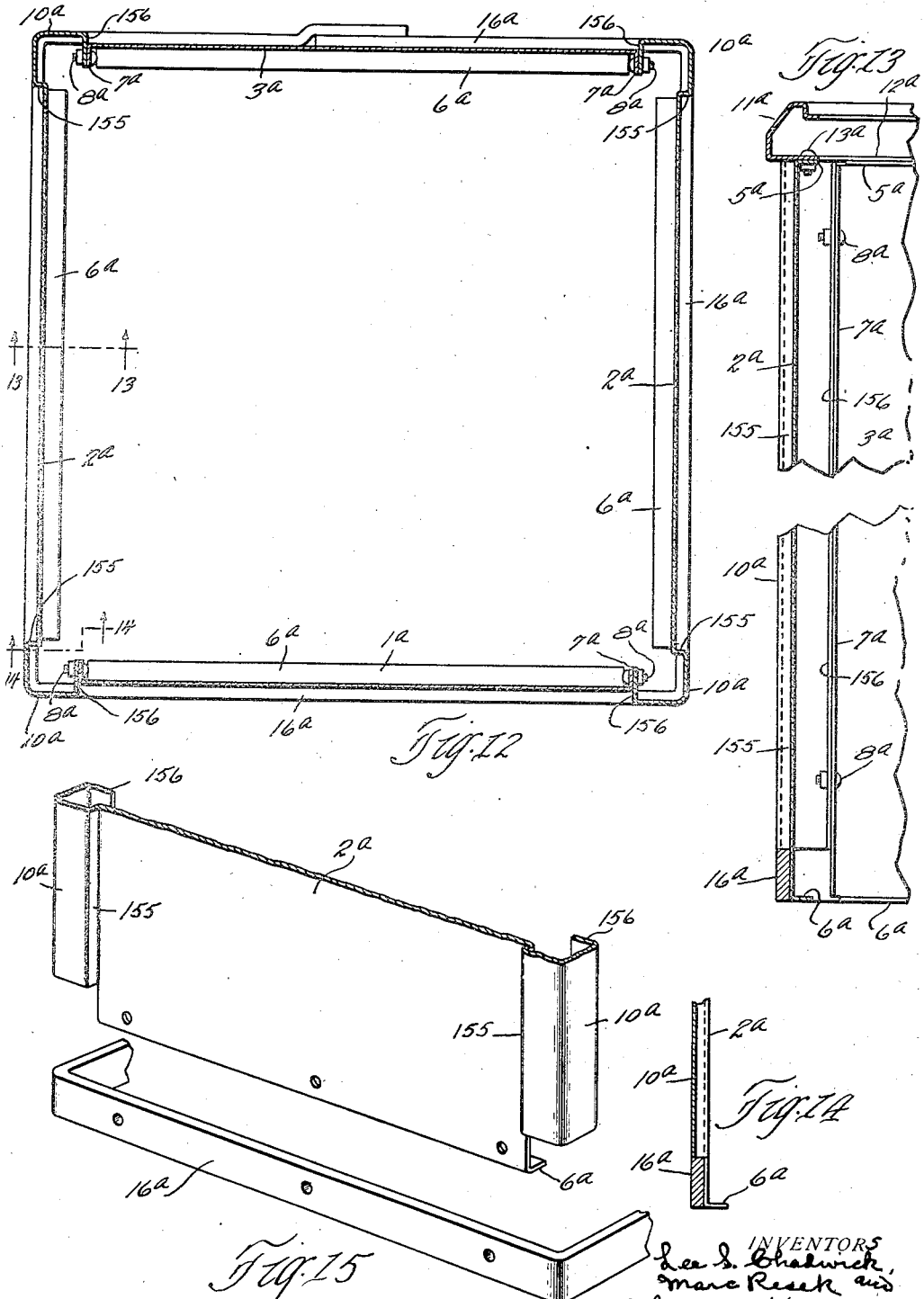

Patented Jan. 23, 1934

1,944,593

UNITED STATES PATENT OFFICE 1,944,593

HEATING APPARATUS

Lee S. Chadwick, Shaker Heights Village, and Marc Resek and Charles J. Kessler, Cleveland Heights, Ohio, assignors to Perfection Stove Company, Cleveland, Ohio, a corporation of Ohio Application October 13, 1930. Serial No. 488,210

22 Claims. (Cl. 126—93)

This invention relates to improvements in heating stoves or apparatus wherein liquid hydrocarbons are used as fuel, and, in respect to certain of its more limited phases, to stoves or heaters of the circulating class in which air is drawn in at the bottom of the stove casing, heated, and discharged at the top. As will hereinafter more fully appear, the invention is also adapted to be incorporated in furnaces.

Among the more general objects of the invention are those of providing a heating stove or apparatus of the above described character that is highly efficient; that is very convenient of use with respect to filling, lighting and cleaning; that is economical in the matter of fuel consumption; that is substantial, durable and safe, and that, when embodied in a room heater, is neat and attractive of appearance. The ease or convenience of lighting and cleaning—the latter with respect to the removal of residue from the fuel pot or basin—is brought about by the provision of a relatively large opening through which access is had to the interior of the fuel pot or basin.

Further and more specific objects are to provide a construction that is comparatively simple, the same being made in most part of sheet metal of suitable gauge and, where practical, in the form of die stampings, the parts being so designed as to expedite and cheapen manufacture and facilitate assembly; to provide a heating apparatus of the kind above set forth in which there is a fuel pot or basin wherein ignition originates and downwardly into which the secondary air is directed so as to create, with the oil vapors and with the primary air that is admitted through openings in the wall of the pot or basin, a turmoil that greatly improves the combustibility of the mixture and tends to keep the fuel pot or basin more free from soot or carbon than it would otherwise be; to provide means for delivering the fuel oil to the pot or basin whose function is unimpaired by a considerable accumulation of soot or carbon, or of ashes from match sticks or paper used in lighting; and to provide a simple but very effective means for removing carbon from the opening that leads from the fuel pot or basin to the combustion chamber, and which means may be operated in an especially convenient manner from outside the heater and without interrupting the operation of the same.

Objects and advantages additional to the foregoing will appear as this description proceeds, reference being had to the accompanying drawings wherein various embodiments of the invention are illustrated and in which like reference characters designate corresponding parts throughout the several views.

Figure 2:
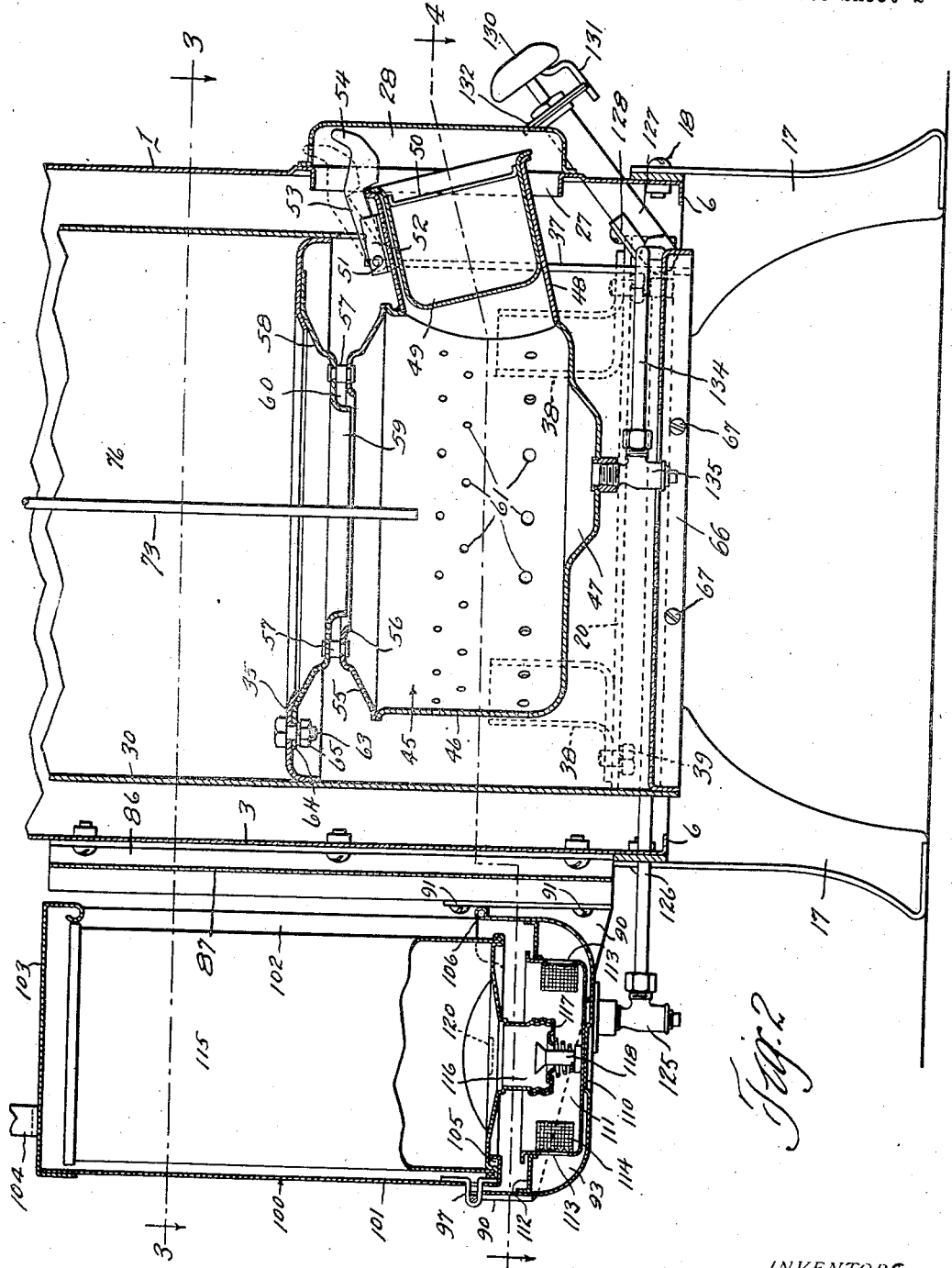
Figure 3:
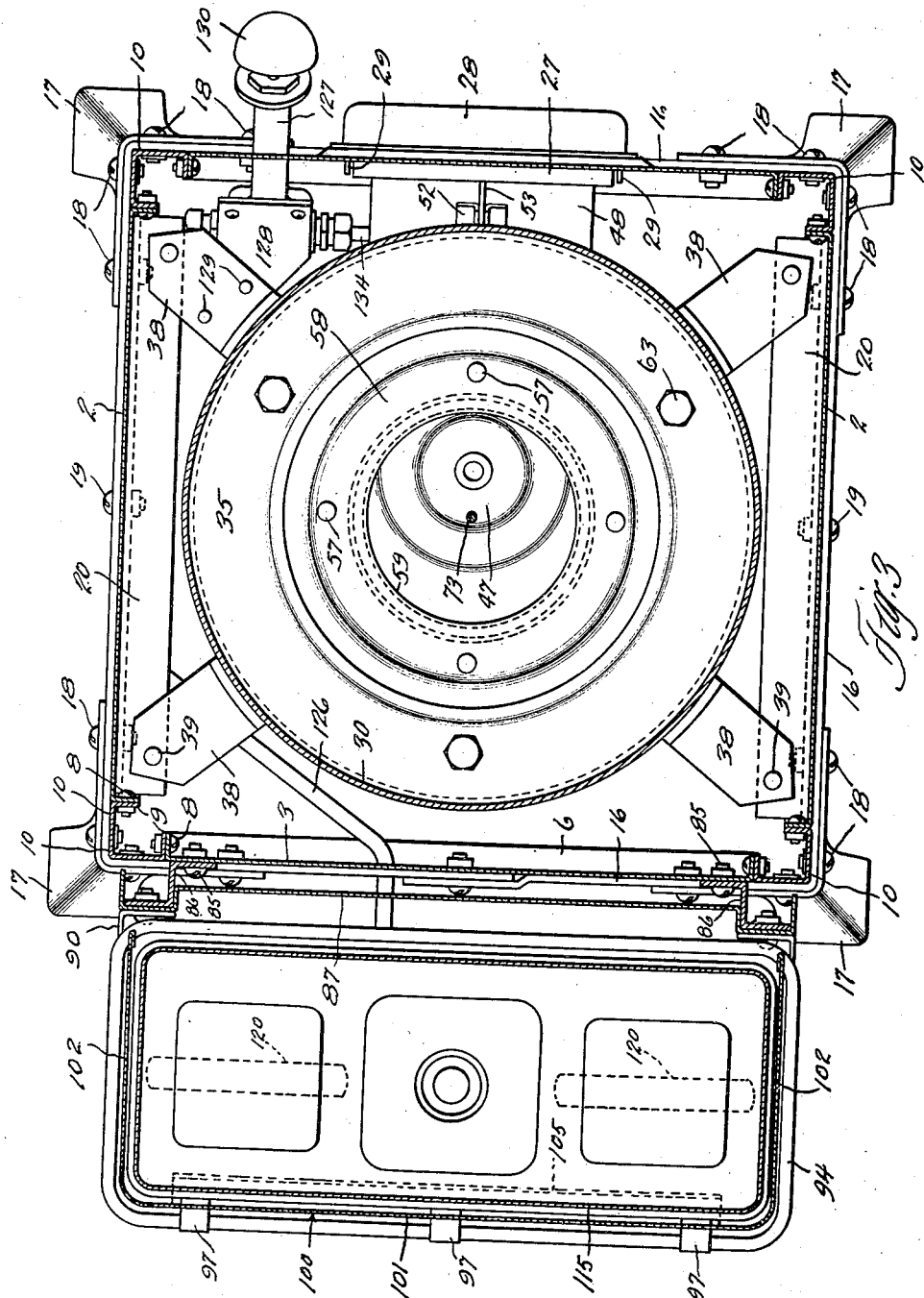
Figure 4:
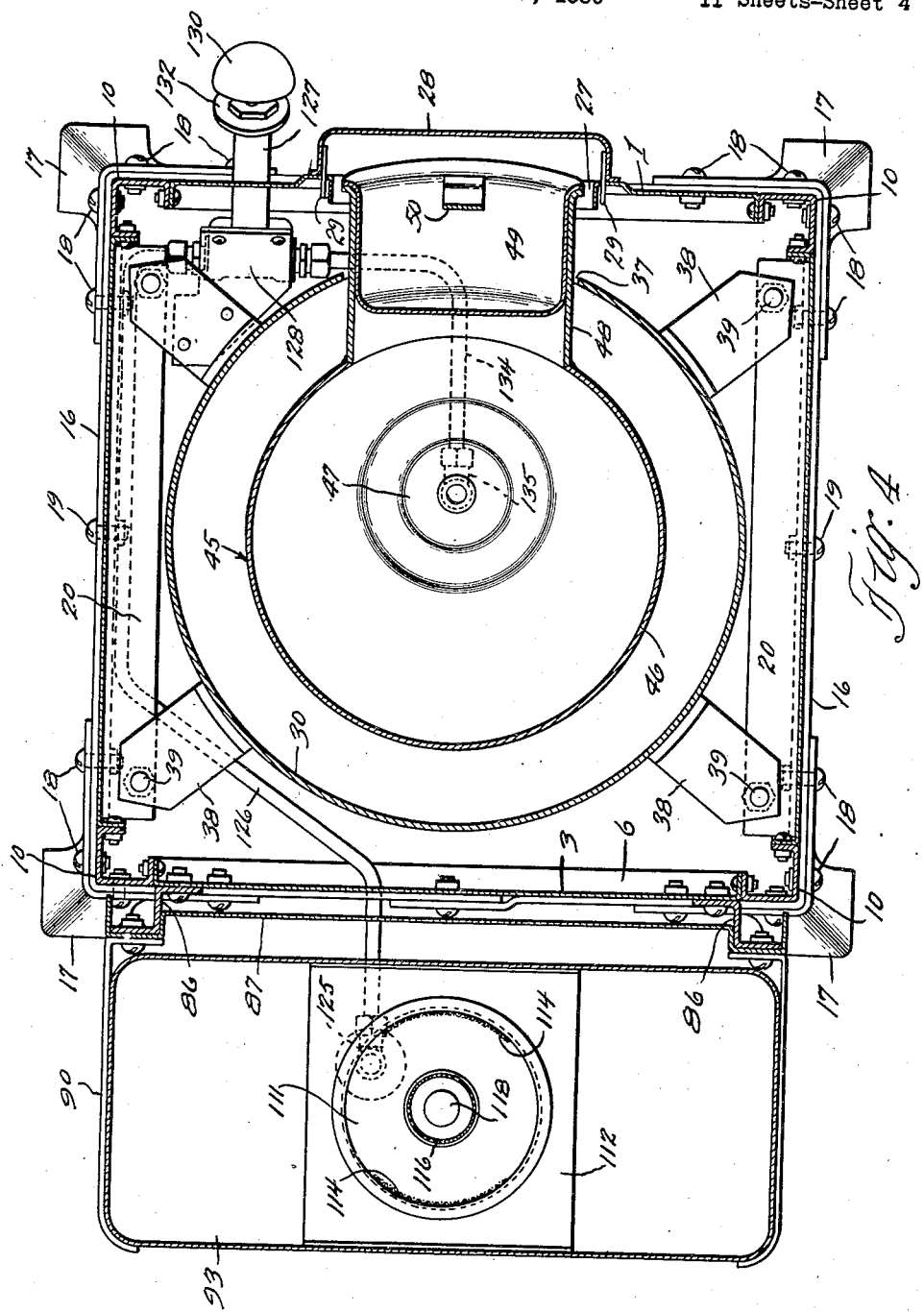

In the drawings, Fig. 1 is a side elevation of a so-called "room" heater incorporating our invention; Fig. 2 is a central vertical section, from front to rear, through the lower portion of the heater, the same being on a scale somewhat enlarged over that of the preceding view; Figs. 3 and 4 are horizontal sections on the respective lines 3—3 and 4—4 of Fig. 2; Fig. 5 is a sectional detail on the line 5—5 of Fig. 1, the same being on the same scale as Figs. 2 to 4; Fig. 6 shows parts of the casing in separated condition; Fig. 7 is a fragmentary sectional side elevation of a heater incorporating a modified form of the fuel pot, this form affording increased heating capacity; Fig. 8 is a section on the line 8—8 of Fig. 7; Fig. 9 shows a structure embodying a further modification of the fuel pot or basin, the present form being of still further increased capacity, and therefore especially adapted for use in a furnace construction, in which connection it is here illustrated; Figs. 10 and 11 are sections on the respective lines 10—10 and 11—11 of Fig. 9, these views being on a scale somewhat smaller than the scale of Fig. 9; and Figs. 12 to 15 are detail views of a modified form of the casing.

With respect to the casing, the heaters shown in Figs. 1 to 6, and in Figs. 7 and 8, respectively, are the same. In each of these instances, the casing comprises a front panel 1, side panels 2 and a rear panel 3. Each panel has a top flange 5, a bottom flange 6, and side flanges 7, which are turned inwardly at right angles to their body portions. The side flanges 7 of the panels are connected by fastening means or bolts 8 to the flanges 9 of corner posts 10 that are angular in cross section, as shown in Figs. 3, 4, 5 and 8. The tops of the corner posts 10 and the upper surfaces of the top flanges 5 of the panels are in a common plane, and surmounting them is a top frame 11 having a base flange 12 that is connected by fastening means or bolts 13 (Fig. 1) to said flanges 7. The top frame 11 is constructed of sheet metal and is given a cross sectional shape to effect the appearance of a molding, and the frame includes a top flange whose inner edge portion is depressed below but is disposed in parallel relation to the top of the frame so as to produce a seat or shoulder 14 on which removable grids 15 rest. The top frame is an integral or one-piece unit.

The lower ends of the panels 1, 2 and 3 extend below the lower ends of the corner posts 10 a distance equal to the vertical dimension of a base frame 16, said frame being attached to the panels with its upper edge substantially flush with the lower edges of the corner posts. Legs 17 that are formed of sheet metal and are angular in cross section fit about the corners of the base frame 16 and are secured thereto by fastening means or bolts 18 the inner ones of which extend also through the panels and assist in securing them to the base frame. Fastening means or bolts 19 secure the lower edges of the panels at their transverse centers to the base frame 16. In addition to performing the duties above ascribed to them, the fastening means or bolts 18 and 19 that are associated with the side panels 2 also secure in place the vertical flanges of substantial angle members whose horizontal flanges provide ledges designated 20 for a purpose that will presently appear.

At their lower ends the side panels 2 are provided with air admitting openings 25, and at their upper ends with air emitting openings 26 and, although not shown for lack of opportunity, the front panel 3 is similarly provided with air emitting openings adjacent its upper end. A suitable distance above its lower edge the front panel 1 is provided with an opening 27, shown as surrounded by an inwardly directed flange, and a closure 28 fits over said opening and is removably held in place by hooks 29 that are engaged through slots in the panel 1.

Situated centrally within the above described rectangular casing is a cylindrical drum 30 that is closed at its upper end by a top wall 31 having a central opening 32 and, if desired, a peek hole 33. This drum is constructed of a heavy gauge of sheet metal, and all the joints and seals thereof are preferably welded, and similarly connected to the interior of the drum a suitable distance above its lower end is a flange 35. At its front side the peripheral wall of the drum is notched upwardly at its lower end, as indicated at 37, to a point slightly below the flange 35. The drum has angle brackets 38 secured, as by welding, to its exterior adjacent its lower end and the horizontal branches of said brackets rest upon and are secured to the previously mentioned ledges 20 by fastening means or bolts 39. The top of the drum is retained in position by a brace 40 that is secured to the top wall 31 and is attached at its ends to diametrically opposite parts of the top frame 11.

45 designates, generally, the fuel pot or basin. The body 46 thereof is preferably drawn from sheet metal, and the same is in the nature of a cup shaped member whose bottom wall is shown as formed with a sump 47 that is desirably located near the front side of the pot where a neck 48 extends forwardly and upwardly from the peripheral wall into the opening 27 of the casing. This neck is relatively large and affords easy access to the interior of the fuel pot or basin for cleaning and lighting purposes and is adapted to be closed by a so-called plug 49 provided near its forward end with a handle 50. Pivoted at 51, to lugs 52 that rise from the upper side of the neck 48, is a latch 53 that serves to hold the plug 49 within the neck 48. The forward end of the latch is so shaped that it will ride over the flanged forward end of the plug when the plug is inserted into the neck, the latch dropping by gravity to effective position; but to insure against failure of the latch to automatically assume effective position when the plug is inserted, the forward end of the latch is made with an extension 54 which interferes with the replacing of the closure 28 over the opening 27 of the casing unless the latch is in locking position.

An annular top wall 55 extends inwardly and upwardly from the upper edge of the peripheral wall of the body 46 and terminates at its inner edge in a downwardly directed lip 56. Rigidly secured to and spaced from this top wall, as by means of shouldered, double ended rivets 57, is an annulus 58 whose inner edge is extended downwardly to form a lip 59 that is spaced inwardly from the previously mentioned lip 56 of the top wall 55. The space between the top wall 55 and the annulus 58, and between their respective lips 56 and 59, constitutes a passageway 60 for the admission of secondary air to the interior of the fuel pot or basin 49, while primary air is adapted to enter the pot or basin through apertures 61 in the peripheral wall of the body 46. The annulus 58, and the fuel pot or basin 45 that is rigidly secured thereto in the manner just described, are adapted to be attached, as a unit, to the flange 35 by fastening means 63. These fastening means are shown as bolts that are extended downwardly through aligned apertures in the flange 35 and annulus 58 and have lock washers and nuts 64 and 65 applied to the lower ends; and to facilitate assembly the heads of the bolts are welded to the flange 35 so as to secure the bolts in place, inasmuch as the unit consisting of the fuel pot and annulus has to be applied to the flange 35 upwardly from beneath the same when assembling the structure.

The combustion device above described in detail may, in more general terms, be defined as consisting of a combustion chamber having a neck that is projected downwardly into the open top of the fuel pot or basin and sustained in spaced relation thereto to provide between said neck and the surrounding portion of the pot or basin a secondary air passageway.

To prevent undue radiation of heat downwardly when the heater is in operation, a shield 66 is desirably supported within the lower end of the drum 30 and the same is shown as attached to the peripheral wall thereof by fastening means 67.

Extending rearwardly from the upper end of the drum 30, through an opening 68 in the rear panel 3, is a flue collar 70; and disposed across the interior of the rear side of the drum immediately below said collar is a baffle 71 (see Fig. 5). The front edge of this baffle is notched at 72 to prevent interference with the action of a cleaning rod or member 73 that extends downwardly through the opening 32 in the top wall 31 of the drum and has its lower end disposed within the opening of the annulus 58 through which communication is established between the combustion chamber 76 thereabove and the fuel pot or basin 45 therebelow. A frusto-conical collar 74, on the rod 73, rests within and closes the opening 32. Access to the upper end of the rod is had through an aperture provided by notches 75 in the adjacent edges of the grids 15 so that a suitable tool may be applied to its upper end for whirling the rod so as to scrape its lower end about the lip 59 and dislodge any soot or carbon that may have accumulated on the lip and which would hinder free communication between the fuel pot or basin and the combustion chamber.

One branch of a T-fitting 78 is applied to the flue collar 70, the same being shown as secured thereto by fastening means 79, while the opposed branch of said fitting is equipped with a gravity damper 80 that is biased toward closed position by a weight 81. The damper 80 is in the nature of a disk that is pivoted at 82 to an annular member 83, said member being suitably secured within the fitting. The third branch of the fitting rises from a point intermediate its ends and to it is adapted to be attached a stove pipe that leads to a chimney.

While, if desired, any embodiment of the invention may be supplied with oil from a remote tank through suitable connections involving a constant level valve, according to common practice, in the form of the invention now under consideration, the fuel supply is shown as obtained from a removable tank or reservoir that is supported by and rearwardly of the stove casing beneath the flue connection thereof. Said tank or reservoir and its associated parts will now be described. Secured to the lower portion of the rear panel 3 adjacent its lateral edges, and by fastening means or bolts 85 (Figs. 2, 3 and 4) are the base flanges of Z bars 86. Supported by and between the Z-bars is a shield 87 whose lateral edges are formed to provide forwardly opening channels for the reception of the rear portions of the Z bars. Brackets 90 are secured, as by fastening means 91, to the lower ends of the Z bars 86 with the adjacent portions of the shield 87 clamped between the attaching plates of the brackets and said bars. The brackets 90 support a pan-like sheet metal receptacle 93 whose upper edge is curled about a relatively stiff wire 94, and at spaced points along the rear edge of the vessel the sheet metal is cut away to expose the wire, and encircling the exposed portions of the wire are hinge members 97. By means of these hinge members a carrier 100 is pivotally connected to the receptacle 93. This carrier comprises a rear wall 101, side walls 102, and an end wall 103, the latter being shown as equipped with a handle 104. The hinge members 97 are extended through slots in the wall 101, and the lower edge of said wall is formed with a channel like seat 105 which extends practically from end to end of the receptacle 93, as shown in Fig. 3. The lower front corners 106 of the side walls 102 rest upon the front corners of the receptacle 93 when the carrier 100 is in normal position, as clearly shown in Fig. 2.

Resting upon a slight elevation 110 that is formed in the bottom wall of the receptacle 93 is a shallow cup 111 that is retained in position by a bridge plate 112 within an aperture of which the cup is disposed. The bridge plate is located at about the transverse center of the receptacle 93, as best shown in Fig. 4, and is supported by and between the front and rear walls of the receptacle. The peripheral wall of the cup 111 is provided with openings 113 that are spaced a suitable distance above the bottom of the cup and are preferably covered by screens 114 of relatively fine mesh. As will be presently seen, the fuel oil enters the receptacle 93 through the screened opening 113 of the cup 111, the screens serving to arrest any foreign matter in the oil which would otherwise pass into the receptacle and any water which may be in the oil gradually accumulates within the bottom of the cup 111, and the cup may be removed and emptied before the water level reaches the height of the lower edges of the openings 113.

Sustained normally in inverted position above the receptacle 93 by the carrier 100 is a removable fuel tank or reservoir 115 having a neck 116 that is equipped with a cap 117 incorporating a spring closed valve 118, the valve being unseated by contact of its stem with the bottom of the cup 111 when the tank or reservoir is in operative position. The reservoir is supported at the proper elevation by the engagement of its lower rear corner within the seat 105 of the carrier 100, and the same is liquid sealed by an accumulation of fuel oil within the receptacle 93 and cup 111 to a level slightly above the plane of the opening controlled by the valve 118. This establishes the liquid level in the fuel pot or basin, as will be evident from what is hereinafter described.

When it is desired to replenish the oil supply it is only necessary to swing the carrier 100 rearwardly by means of the handle 104 so as to impart like movement to the tank or reservoir 115, and as the carrier moves below the horizontal plane of its hinge connection with the receptacle 93, the tank or reservoir will slide downwardly until it engages the end wall 103 of the carrier and withdraw from the seat 105 the edge portion which formerly occupied the same. When the carrier comes to rest the tank or reservoir may be lifted therefrom by means of handles 120 (Fig. 3) wherewith the reservoir is equipped and carried away and refilled and returned to the carrier, after which the carrier may, by grasping the handle 104, be swung to its upright position thereby to invert the tank or reservoir over the vessel 93. As a matter of convenience, and to expedite refueling of the stove, one or more filled tanks or reservoirs may be kept on hand.

It is desirable to locate the reservoir at the rear of the heater below the flue connection, and hinge the carrier so as to swing rearwardly of its normal position, for the reason that this arrangement insures the heater being set far enough away from the wall having the flue or chimney to which the heater is connected to prevent heating the wall to a dangerous degree.

An outlet fitting 125, that depends from the bottom wall of the receptacle 93, is connected by a pipe 126 to a valve 127 that is supported by a member 128 in the forward right hand corner of the casing of the heater, considering the same as viewed from the front. The member 128 is secured by fastening means 129 to the adjacent bracket 38. The operating handle 130 of the valve is located in a convenient position forwardly of the heater and has an indicator finger 131 connected to it which cooperates with a dial 132. This is a standard valve of the so-called "metering" type and enables the flow of fuel to be accurately controlled. The outlet side of the valve is connected by a pipe 134 with a fitting 135 that is communicatively connected to the bottom wall of the sump 47 of the fuel pot or basin 45.

From the foregoing it is clear that the fuel is conducted from the receptacle 93 to the sump 47, and that the flow of oil from the former to the latter is controlled by the valve 127. It is also evident that the maximum oil level in the fuel pot or basin cannot exceed that prevailing in the receptacle 93. With the stove or apparatus standing level, as intended, the oil cannot attain a height above the top of the sump 47 and as a consequence of this, even with the valve 127 inadvertently left open, the oil will be confined to the sump and will not flood the bottom of the fuel pot or basin but restrict the quantity present therein to a very small amount so that there will be no danger of an explosion when the heater is next lighted.

When it is desired to light the heater, the closure 28 and the plug 49 are removed and the valve 130 is opened to allow fuel to flow into the sump 47, and a lighted match or taper or a piece of burning paper may be thrown or projected into the fuel pot or basin through the neck 48 to ignite the oil. The valve 130 may then be adjusted to effect the desired flow, depending upon the size of fire that is wanted, and when the valve is wide open there can only be an accumulation of oil within the fuel pot or basin to a height established by the elevation of the open end of the fuel tank or receptacle 115, as previously explained. After the fire is lighted the plug 49 is returned to position within the neck 48 where it is held by the latch 53, and if the plug has been properly emplaced so that the latch descends to normal position, the closure 28 may be engaged over the opening 27. The fire may be regulated from time to time by a manipulation of the valve handle 130, and the character of the fire may be ascertained by looking through the peek hole 33 in the top of the drum 30, thus making it unnecessary to remove the closure 28 and plug 49 for the purpose.

As previously explained, primary air is admitted to the fuel pot or basin 45 through the perforations 61 in the peripheral wall of the body 46, and these openings are so arranged and so graduated in size as to effect a proper distribution of the primary air with respect to the oil vapors. At the same time secondary air is admitted through the passageway 60, and it is directed downwardly into the fuel pot or basin by the lip 59 so as to create therein a turmoil which causes the air and oil vapors to be thoroughly mixed, insuring their burning with the highest efficiency and with the least production of soot or carbon. When an objectionable amount of soot or carbon accumulates about the rim of the fire pot or basin, it may be readily dislodged by whirling the rod 73 in the manner already described. The soot may be allowed to fall upon the bottom of the fuel pot and gathered there in considerable quantity without in any way interfering with the operation of the apparatus. In fact experience has shown that the action of the heater is improved by a certain amount of soot and ash within the fuel pot, and for this reason it is only occasionally necessary to clean out the fuel pot or basin through the opening of the neck 48.

The volume of combustion takes place above the annulus 58 within the lower portion of the combustion chamber 76 and as the products rise they are deflected forwardly by the baffle 71 before escaping through the flue collar 70. Therefore, while the apparatus is in operation, the wall of the drum 30 becomes highly heated above the region of the fuel pot or basin, and this heat is given off to air entering about the bottom of the drum between it and the panels of the casing and through the openings 25 in the side panels, and escaping at the top of the heater through the openings 26 and through the grids 15. Moisture may be imparted to the air as it rises through the casing by a humidifier 140 which consists of a cylindrical vessel having a closed lower end and open top that is suitably and preferably removably supported within one corner of the casing adjacent the top of the drum 30, the same being adapted to contain water.

In enlarging the size of a heater of the kind above described for the purpose of increasing its heating capacity, there is a limit to which one can go in the enlarging of the fuel pot or basin for the reason that as the pot or basin increases in diameter the openings and passageways for admitting primary and secondary air are so far removed from the central portion of the pot or basin that such portion is robbed of air for the promotion of combustion, and, as a consequence thereof, the fire is rendered smoky and inefficient. To meet this situation in the larger sizes of heaters we provide means for conducting air to the central portion or other parts of the fuel pot or basin that are so remote from the peripheral wall as to be incapable of being served with air from the openings therein and passageways associated therewith. Within a certain range of sizes it is practical to provide the fuel pot or basin with a central flue through which air is conducted to the surrounding zone. Such a construction is illustrated in Figs. 7 and 8 wherein the central flue is designated 46$^a$ and is provided with primary air admitting openings 61$^a$. The upper end of the flue is curled over to provide a lip 56, and supported by and above the upper end of the flue, through the medium of rivets 57$^a$, is a plate 58$^a$ having a downturned peripheral lip 59$^a$, the space between the plate and flue providing a secondary air passageway 60$^a$. To insure a proper distribution of fuel oil within the bottom of the pot or basin so that the oil vapors will be diffused about the interior of the vessel and thus receive throughout their full extent the air for promoting combustion, we provide a plurality of sumps 47$^a$, two being shown in the present instance, that are connected together by channels 142. The sumps are equipped with inlet connections 135$^a$ that are connected together by a manifold 143 that is supplied with fuel oil through a pipe 134$^a$. In all other respects the construction shown in Figs. 7 and 8 is the same as that above described, and like reference characters designate the remaining corresponding parts of the two structures.

When the size of the fuel pot or basin is so enlarged that a central flue becomes inadequate to supply air to the interior region of the vessel, we may construct the pot or basin as illustrated in Figs. 9, 10 and 11. These larger sizes, while being applicable to so-called room heaters, are also adapted for use in furnaces, and such an adaptation of the invention is indicated in the views above mentioned.

As shown best in Fig. 11, the body 46 is of clover-leaf shape in plan and is provided with a plurality of flues 46$^b$, one being located centrally within each lobe that corresponds to one of the clover leaves. The bottom wall of the pot or basin is provided with sumps 47$^b$ on opposite sides of each of the flues, and the sumps are interconnected by channels 142$^b$. As in the modification last described, each flue is surmounted by a plate 58$^b$, connected thereto and spaced therefrom by rivets 57$^b$, and the secondary air spaces between said plates and flues are designated 60$^b$. The primary air admitting openings of the flues are shown at 61$^b$. The inlet fittings 135$^b$ of the several sumps are shown as connected together by a three-branch manifold 143$^b$ which receives its supply of oil through a pipe 134$^b$. In the present case, the drum 30 is shown as supported by legs 145 centrally within a shell or casing 146 that may rest directly upon a cement or other fireproof floor 147. The shell or casing is provided adjacent its lower end with relatively large air admitting openings 148 and with a door opening that registers with the neck 48 of the fuel pot or basin, the same being surrounded by a frame 149 to which a door 150 is hinged.

As best shown in Fig. 10, the flange 35 and the plate 58 that is connected thereto have openings corresponding in shape to that of the fuel pot or basin. The rod 73 may be swung about the periphery of the opening in the member 58 and about each of the plates 58ᵇ for the purpose of dislodging soot or carbon, substantially in the same manner as in the former instances. Especially in the case of a furnace, the fuel oil may be supplied from a remote source through a pipe 126ᵇ that leads to the metering valve 127ᵇ.

In the modified form of casing, illustrated in Figs. 12 to 15, two corner posts are formed integral with each of two opposed side panels, while the other two panels remain as before. Although, so far as the invention is concerned, the corner posts may be incorporated in either the front and rear panels, designated 1ᵃ and 3ᵃ respectively, or in the side panels 2ᵃ, we prefer to show them as made a part of the latter.

Adjacent the lateral edge of the side panels 2ᵃ, the material whereof they are constructed is extended outwardly approximately the thickness of the base frame 16ᵃ, as shown at 155, and then into planes parallel with the body portions of the panels until given right angle turns inwardly to define the corners of the posts 10ᵃ. The extreme lateral edges of the panels are then turned toward each other to form flanges 156. The panels have top and bottom flanges, 5ᵃ and 6ᵃ, respectively, as in the previous instance, and the bottom flange 12ᵃ of the top frame 11ᵃ is shown as secured by fastening means 13ᵃ to the top flanges 5ᵃ. The side flanges of the front and rear panels are connected by fastening means 8ᵃ to the flanges 156 of the side flanges.

The corner posts 10ᵃ terminate at their lower ends above the lower edges of the body portions of the panels a distance approximately equal to the vertical dimension of the base frame 16ᵃ, and when the panels are applied to the base frame the corner posts rest on the top of the latter, while the bodies of the panels extend down on the inner sides of and are secured to the frame, in the manner clearly illustrated in the drawings.

This design of casing provides a very substantial construction, as it will be readily appreciated, and one that is quicker and more convenient of assembly than the previously described form.

Having thus described our invention, what we claim is:

1. Heating apparatus comprising, in combination, a fuel basin having means for admitting primary air thereto, and a combustion chamber above the same having a neck that projects into the basin and is in spaced relation to the rim thereof so that secondary air that is drawn in through the space between the combustion chamber and fuel basin is deflected downwardly into the basin.

2. Heating apparatus comprising, in combination, a fuel basin having means for admitting primary air thereto, a cover for said basin provided with an opening, and a combustion chamber above the basin and having a neck that projects into said opening and is spaced from the surrounding portion of the cover so that secondary air drawn in through the space between the cover and the neck is deflected downwardly into the fuel basin.

3. Heating apparatus comprising, in combination, a fuel basin having means for admitting primary air thereto, a cover for said basin provided with an opening, the material of said cover about said opening being turned downwardly, and a combustion chamber above the basin having a bottom wall that is spaced from the cover and is provided with an opening about which the material of said wall is turned downwardly to form a neck that projects into the opening of the cover in spaced relation to the edge thereof so that secondary air that is drawn in through the space between said bottom wall and the cover is deflected downwardly into the fuel basin.

4. Heating apparatus comprising, in combination, a combustion chamber having a bottom wall provided with an opening about which the material of the wall is extended downwardly to form a neck, a fuel basin having means for admitting primary air thereto and provided with a cover having an opening into which said neck projects, and means connecting and spacing apart the cover of the fuel basin and the bottom wall of the combustion chamber and by means of which the fuel basin is supported.

5. Heating apparatus comprising, in combination, a cylindrical drum enclosing a combustion chamber and having a flue outlet adjacent its upper end, a flange extending about the interior of the drum above the lower end thereof and defining the lower end of the combustion chamber, a member engaged with the underside of and secured to said flange and having an opening surrounded by a depending lip, a fuel pot having a top wall secured to and spaced from said member and having an opening larger than and registering with the opening of said member, the opening in said top wall being surrounded by a depending lip that is spaced outwardly from the aforesaid lip so that air entering between the lips will be deflected downwardly, the fuel pot being provided with primary air openings, and means for delivering fuel to the fuel pot.

6. Heating apparatus comprising, in combination, a combustion chamber having a top wall provided with a relatively small opening and a bottom wall provided with a relatively large opening, a combustion device supported below the opening of the bottom wall, and a cleaning member depending through and closing the opening in the top wall of the combustion chamber and projecting into the opening of the bottom wall thereof and being capable of being moved about the latter opening without uncovering the former opening.

7. Heating apparatus comprising, in combination, a combustion chamber having a flue outlet adjacent its upper end, a fuel pot supported below the combustion chamber, said fuel pot having a relatively large laterally projecting neck, a plug removably fitted within said neck, and a latch movably carried by the neck for cooperation with said plug to retain it in place.

8. Heating apparatus comprising, in combination, a casing, a combustion chamber supported within the casing in spaced relation to the walls thereof, the combustion chamber having a flue outlet adjacent its upper end, a fuel pot supported below the combustion chamber and having a neck extending laterally from one side thereof, the casing having an opening through which access may be had to the neck of the fuel pot, a member for closing the neck of the fuel pot, a latch for holding said member in place, and a closure for the opening of the casing, said latch serving to prevent the closure from assuming normal position excepting when the latch is in member holding position.

9. Heating apparatus consisting of a combustion chamber, and a fuel basin below the combustion chamber, the apparatus having a throat opening through which said chamber and basin communicate, and a rod loosely sustained by the upper portion of the apparatus and depending through said opening and operable to clear the opening of carbon deposit.

10. Heating apparatus consisting of a combustion chamber, and a fuel basin below the combustion chamber, the apparatus having a throat opening through which said chamber and basin communicate, a wall above the combustion chamber having an aperture that is substantially in vertical alignment with said throat opening, and a rod extending through said aperture and depending within said throat opening and operable from above said wall to clear the opening of carbon deposit.

11. Heating apparatus consisting of a combustion chamber, and a fuel basin below the combustion chamber, the apparatus having a throat opening through which said chamber and basin communicate, a wall above the combustion chamber having an aperture that is substantially in vertical alignment with said throat opening, a rod extending through said aperture and depending within said throat opening and operable from above said wall to clear the opening of carbon deposit, and an upwardly diverging collar on said rod that serves to close the aperture and support the rod.

12. Heating apparatus comprising, in combination, a combustion chamber, a fuel basin below the combustion chamber, a flue rising from the bottom wall of the fuel basin for admitting air, the bottom wall being provided with sumps and channels connecting said sumps, and means for delivering fuel oil to the sumps.

13. Heating apparatus comprising, in combination, a combustion chamber, a fuel basin below the combustion chamber, a flue rising from the bottom wall of the fuel basin for admitting air, the bottom wall being provided with sumps on opposite sides of said flue and channels connecting said sumps, and means for delivering fuel oil to the sumps.

14. Heating apparatus comprising, in combination, a combustion chamber having an opening at its lower end surrounded by a depending lip, a fuel basin having an open top spaced below the aforesaid opening and from said lip so that secondary air may enter through the space thus provided and be directed downwardly into the fuel basin by said lip, a flue rising from the bottom wall of the fuel basin to about the plane of the top of the basin, a plate spaced above the upper end of the flue and surrounded by a depending lip so that secondary air may enter through the space thus provided and be directed downwardly by said lip, said flue being perforated for the admission of primary air to the fuel basin.

15. Heating apparatus comprising, in combination, a combustion chamber, a partition defining the bottom of said chamber, said partition having an opening, a fuel basin supported below the combustion chamber and having its peripheral portion spaced from said partition to provide between the two a passageway for admitting secondary air, a plurality of flues rising from the bottom wall of the fuel basin to approximately the plane of the top of said basin, caps supported above and in spaced relation to the upper ends of said flues to provide passageways for the admission of secondary air, the peripheral wall of the fuel basin and said flues having perforations for the entrance of primary air, the bottom wall of the fuel basin having sumps on opposite sides of each of the flues and channels connecting said sumps, and means for delivering fuel oil to the sumps.

16. Heating apparatus comprising, in combination, a drum enclosing a combustion chamber, a partition spaced above the lower end of the drum and defining the bottom of the chamber, said partition having an opening that is surrounded by a depending lip, a fuel pot having a top wall provided with an opening registering with the opening in the partition and surrounded by a depending lip which is spaced outwardly from the former lip thereby to provide between the two a secondary passageway, a flue rising from the bottom wall of the fuel pot and having its upper end flared outwardly and downwardly in substantially the plane of the top wall of the fuel pot, a plate supported by and above the flue in spaced relation to the top thereof and having its peripheral portion flanged downwardly to provide a lip that is spaced from the flared top of the flue, the peripheral wall of the fuel pot and said flue having perforations for the entrance of primary air, the bottom wall of the fuel pot having sumps on opposite sides of the flue and channels connecting said sumps, and means for admitting fuel oil to the sumps.

17. Heating apparatus comprising a casing having an internal flange spaced above its lower end, and a unitary structure within the casing below said flange and consisting of a fuel pot having a top wall provided with an opening and a member permanently secured to and spaced from said top wall and having an opening registering with the opening of the top wall, the spacing of said member from said wall providing a restricted air passage, the peripheral portion of said member being arranged for engagement with the underside of the flange, and fastening means removably attaching the unitary structure to the flange and positioning it in definite relation thereto.

18. Heating apparatus comprising, in combination, a sheet metal casing having an internal circumferential flange a suitable distance above its lower end, a unitary structure within the casing below said flange consisting of a fuel pot having an annular top wall and an annulus permanently secured to and spaced from said wall so as to leave between the two a restricted air passage, the edge portion of the annulus being arranged for engagement with the underside of the flange, and fastening means extending through aligned holes in the annulus and flange for removably attaching the said unitary structure to the flange in a definite position with respect thereto.

19. In heating apparatus of the class set forth, a firepot having perforations in its side wall, means for delivering fuel to the bottom of the pot for vaporization and mixing with air entering through said perforations, said side wall being interrupted by a hand hole, and means for closing said hole.

20. In heating apparatus of the class set forth, a firepot having perforations in its peripheral wall, means for delivering fuel to the bottom portion of the pot for vaporization and mixing with air entering through said perforations, said peripheral wall having a hand hole, a neck extending laterally from said wall about the hand hole, and means for closing said neck.

21. In heating apparatus of the class set forth, a firepot having perforations in its peripheral wall, means for delivering fuel to the bottom portion of the pot for vaporization and mixing with air entering through said perforations, said peripheral wall having a hand hole, a neck extending laterally from said wall about the hand hole, a plug insertable within the neck for closing the opening therethrough, and means for locking the plug within the neck.

22. In heating apparatus of the class set forth, a firepot having perforations in its peripheral wall, means for delivering fuel to the bottom portion of the pot for vaporization and mixing with air entering through said perforations, said peripheral wall having a hand hole, a neck extending laterally from said wall about the hand hole, and a plug projecting into the neck from the outer end thereof and removable from the neck and whose inner end is adjacent the plane of said peripheral wall.

LEE S. CHADWICK.
MARC RESEK.
CHARLES J. KESSLER.